(12) United States Patent
Batmanglidj et al.

(10) Patent No.: US 11,770,589 B2
(45) Date of Patent: *Sep. 26, 2023

(54) USING TEXT DATA IN CONTENT PRESENTATION AND CONTENT SEARCH

(71) Applicant: Comcast Cable Communications, LLC, Philadelphia, PA (US)

(72) Inventors: Jamie Batmanglidj, Denver, CO (US); Neill Kipp, Centennial, CO (US); Justin Riggert, Centennial, CO (US); Joseph Kiok, Arcadia, CA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/829,907

(22) Filed: Mar. 25, 2020

(65) Prior Publication Data

US 2021/0014574 A1 Jan. 14, 2021

Related U.S. Application Data

(63) Continuation of application No. 14/730,869, filed on Jun. 4, 2015, now Pat. No. 10,645,457.

(51) Int. Cl.
*H04N 21/482* (2011.01)
*H04N 21/488* (2011.01)
*H04N 21/845* (2011.01)
*H04N 21/434* (2011.01)

(52) U.S. Cl.
CPC ..... *H04N 21/4828* (2013.01); *H04N 21/4348* (2013.01); *H04N 21/4821* (2013.01); *H04N 21/4882* (2013.01); *H04N 21/4884* (2013.01); *H04N 21/8456* (2013.01)

(58) Field of Classification Search
None
See application file for complete search history.

(56) References Cited

U.S. PATENT DOCUMENTS

| | | | |
|---|---|---|---|
| 6,061,056 A | 5/2000 | Menard et al. | |
| 6,901,207 B1* | 5/2005 | Watkins | H04N 7/163 386/E5.064 |
| 7,712,117 B1* | 5/2010 | Mohr | H04N 21/435 725/41 |

(Continued)

OTHER PUBLICATIONS

U.S. Appl. No. 15/154,409 2017/0329762, filed May 13, 2016 Nov. 16, 2017, Christopher Lintz (Comcast Cable Communications, LLC).

*Primary Examiner* — Omar S Parra
(74) *Attorney, Agent, or Firm* — Ballard Spahr LLP

(57) ABSTRACT

Methods and systems for using text data in content presentation and content search are disclosed. Text data and a plurality of video frames can be extracted from a content program and stored in a database. Extracted text data can be divided into a plurality of text segments. The plurality of text segments and the plurality of video frames can be presented in the form of an electronic book or guide. In addition, the content program can be divided into a plurality of content segments and stored in the database. The plurality of content segments and the plurality of text segments can be associated by time indices. A user can identify one or more content segments in the database by a query, and notifications can be sent according to the query.

20 Claims, 8 Drawing Sheets

(56) References Cited

U.S. PATENT DOCUMENTS

| | | | |
|---|---|---|---|
| 8,736,761 B2* | 5/2014 | Kendall | H04N 21/4355 |
| | | | 348/473 |
| 9,621,613 B1* | 4/2017 | Huang | H04N 21/2393 |
| 9,881,084 B1 | 1/2018 | Robertson et al. | |
| 2003/0088687 A1 | 5/2003 | Begeja et al. | |
| 2003/0093790 A1* | 5/2003 | Logan | G11B 27/34 |
| | | | 725/38 |
| 2003/0149727 A1* | 8/2003 | Jaschek | H04N 21/4668 |
| | | | 348/E5.006 |
| 2007/0112837 A1 | 5/2007 | Houh et al. | |
| 2010/0023506 A1 | 1/2010 | Sahni et al. | |
| 2010/0162313 A1 | 6/2010 | Ruiz-Velasco et al. | |
| 2011/0149153 A1* | 6/2011 | Nam | H04N 21/4884 |
| | | | 348/468 |
| 2013/0325869 A1 | 12/2013 | Reiley et al. | |
| 2013/0326406 A1 | 12/2013 | Reiley et al. | |
| 2014/0074866 A1 | 3/2014 | Shah et al. | |
| 2014/0161417 A1* | 6/2014 | Kurupacheril | H04N 21/4828 |
| | | | 386/241 |
| 2015/0095366 A1* | 4/2015 | Mo | H04N 21/475 |
| | | | 707/769 |
| 2015/0113013 A1* | 4/2015 | Rys | H04N 21/4325 |
| | | | 707/758 |
| 2016/0014482 A1 | 1/2016 | Chen et al. | |
| 2016/0149956 A1 | 5/2016 | Birnbaum et al. | |
| 2020/0053409 A1* | 2/2020 | Abed | H04N 21/8352 |

* cited by examiner

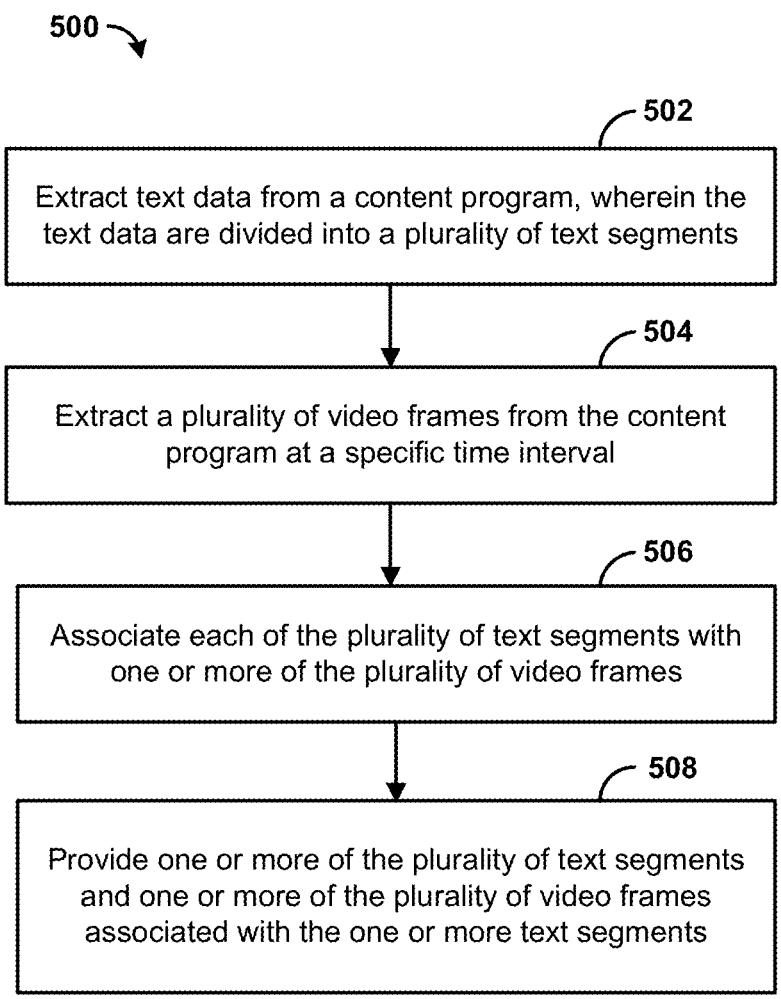

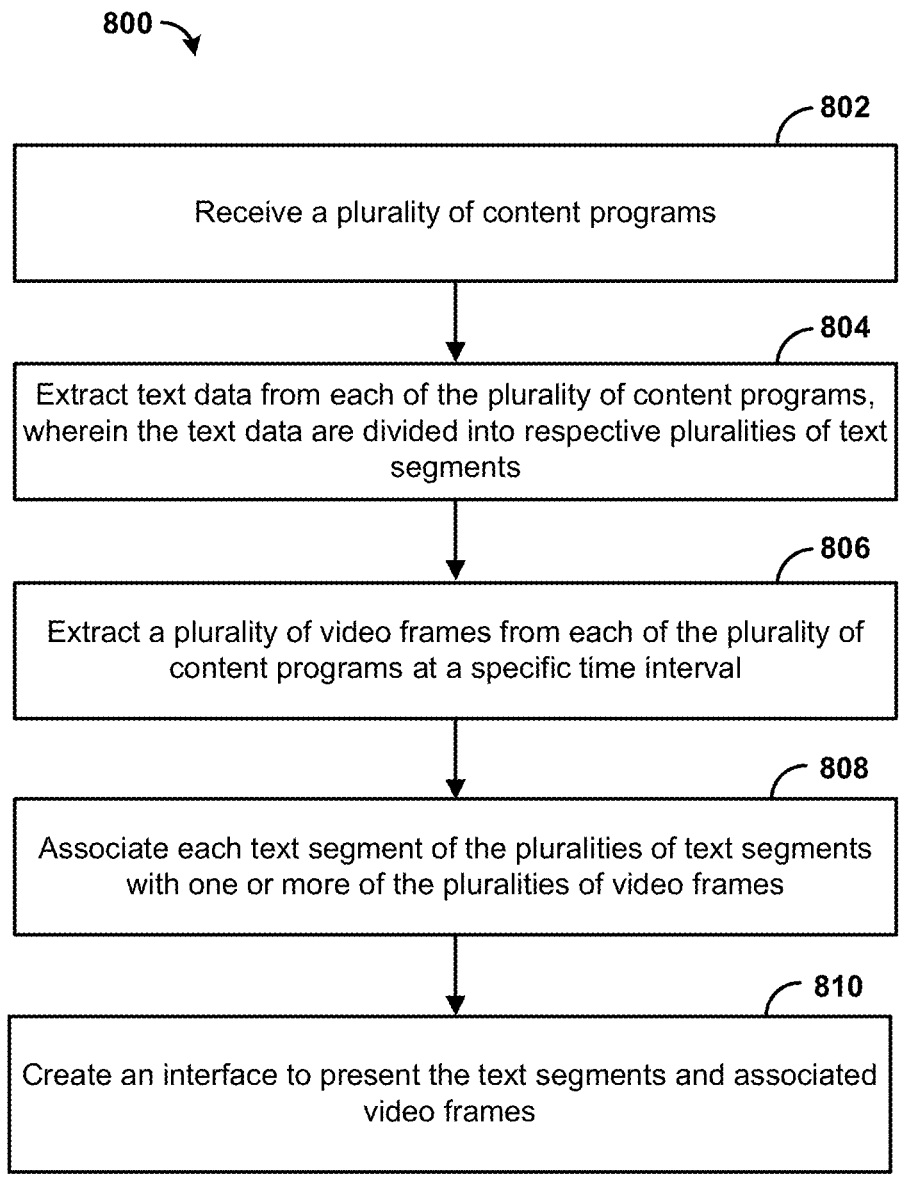

USING TEXT DATA IN CONTENT PRESENTATION AND CONTENT SEARCH

CROSS REFERENCE TO RELATED APPLICATION

This application is a continuation of U.S. Non-Provisional application Ser. No. 14/730,869, filed Jun. 4, 2015, which is herein incorporated by reference in its entirety.

BACKGROUND

A hearing impaired person often consumes content, such as television programming, by reading text obtained from closed captioning (CC) data. A user who is more interested in a text (e.g., dialogue) portion of content, rather than a video portion, is forced to read the text portion at the speed the associated video portion is provided. This is despite the fact that oftentimes the user can read the text portion faster or slower than the video portion is played. There is a need to utilize text portions of content to make content consumption more appealing and versatile. These and other shortcomings of the prior art are addressed by the present disclosure.

SUMMARY

It is to be understood that both the following general description and the following detailed description are exemplary and explanatory only and are not restrictive, as claimed. Methods and systems are herein described for using text data in content presentation and/or content search. The methods and systems presented herein can allow a user to search for particular content items and/or subject matter based on text data (e.g., closed caption information, subtitles, transcribed dialogue, words that describe a scene, metadata, and the like) associated with content programs. The text data can also be extracted and associated with still frames of video extracted from the content program to form an electronic book and/or a guide, such as an electronic program guide.

In an aspect, text data (e.g., closed caption information, subtitles, transcribed dialogue, words that describe a scene, metadata, and the like) and a plurality of video frames can be extracted from a content program and stored in a database. The extracted text data can be divided into a plurality of text segments. The plurality of text segments and the plurality of video frames can be presented in the form of an electronic data such as a book and/or an electronic program guide. In addition, the content program can be divided into a plurality of content segments and stored in the database. The plurality of content segments and the plurality of text segments can be associated by, for example, time indices. A user can search for one or more content segments in the database by a text query. Matching content segments can be identified by the text data and correlated with the time indices.

In an aspect, an example method can comprise dividing a content program into a plurality of content segments and each of the plurality of content segments can be associated with a respective time index. Text data can be extracted from the plurality of content segments and can comprise one or more of closed captioning data, subtitles, or metadata. The extracted text data and the plurality of content segments can be stored in a database. One or more of the plurality of content segments in the database can subsequently be identified in response to a query against the extracted text data.

In another aspect, text data (e.g., closed caption information, subtitles, transcribed dialogue, words that describe a scene, metadata, and the like) can be extracted from a content program. The text data can be divided into a plurality of text segments. Each of the plurality of text segments can be associated with a respective time index. A plurality of video frames can be extracted from the content program at a specific time interval. In an aspect, each of the plurality of text segments can be associated with one or more of the plurality of video frames based on associating the respective time index of each of the plurality of text segments and the specific time interval. One or more text segments and one or more of the plurality of video frames associated with the one or more text segments can be provided simultaneously, for example, in the form of an electronic book and/or an electronic program guide.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 5 is a flow chart of an exemplary method;

FIG. 8 is a flow chart of another exemplary method.

DETAILED DESCRIPTION

Figure 1:
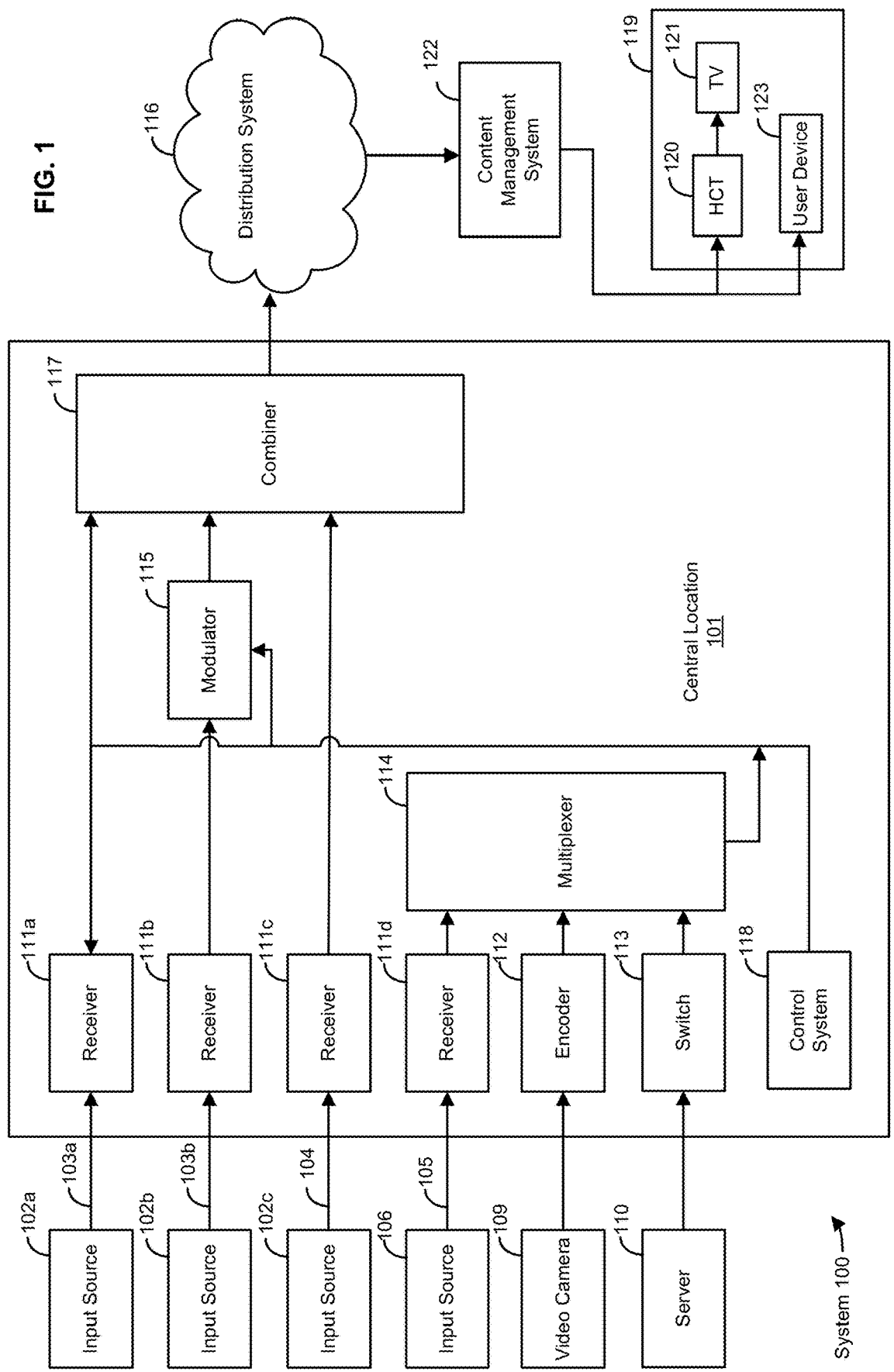
FIG. 1 illustrates various aspects of an exemplary system in which the present methods and systems can operate.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Methods and systems are herein described for using text data in content presentation and/or content search. In an aspect, text data and a plurality of video frames can be extracted from a content program and stored in a database. Extracted text data can be divided into a plurality of text segments. In an aspect, each text segment can comprise a portion of the text data. The plurality of text segments and the plurality of video frames can be presented in the form of an electronic book and/or an electronic program guide. In another aspect, the content program can be divided into a plurality of content segments and stored in the database. The plurality of content segments and the plurality of text segments can be associated by, for example, time indices. A user can search for one or more content segments in the database by a text query. Matching content segments can be identified by the text data and correlated with the time indices.

In an aspect, the disclosed methods and systems allow a user to search for matching text in content presented on one or more channels available to the user, including live channels. The search can indicate a time within which to search. The time within which to search can be a relative time (e.g., a point or range of time within a duration of the content, a range of time relative to the current time, etc.). For example, the search can be a search for content containing certain text in the past 60 seconds. In an aspect, a search can use text data (e.g., closed captioning data, subtitles, and the like). The text data can comprise closed captioning data extracted from a plurality video streams (e.g., linear or time shifted video streams), and can be stored in a database. The plurality of video streams can be buffered on disk such that a user can play back and watch buffered linear content from any configurable amount of buffer time (e.g., 1 minute, 2 minutes). This allows the user to search live TV for content and then watch the matching content (e.g., the content that corresponds to the result of the text data search). The extracted closed captioning data can be stored with the ability for full text index searching.

In another aspect, a user can have an option to enable an event notification for a search. If there is no matching content at the time of a search, the user can be notified as soon as matching content is found. The notification can take the form of any message, for example, a pop up message on a television or user device (e.g., smartphone, tablet, etc.), text message, email, and the like. In an aspect, content search notification can be filtered to specific channels. For example, a user can be notified when "Red Sox" is mentioned on Channel 9.

FIG. 1 illustrates various aspects of an exemplary system in which the present methods and systems can operate.

Those skilled in the art will appreciate that present methods may be used in systems that employ both digital and analog equipment. One skilled in the art will appreciate that provided herein is a functional description and that the respective functions can be performed by software, hardware, or a combination of software and hardware.

The system 100 can comprise a central location 101 (e.g., a headend, a data processing facility, etc.), which can receive content (e.g., data, input programming, and the like) from multiple sources. The central location 101 can combine the content from the various sources and can distribute the content to user (e.g., subscriber) locations (e.g., location 119) via distribution system 116.

In an aspect, the central location 101 can receive content from a variety of sources 102a, 102b, 102c. The content can be transmitted from the source to the central location 101 via a variety of transmission paths, including wireless (e.g. satellite paths 103a, 103b) and terrestrial path 104. The central location 101 can also receive content from a direct feed source 106 via a direct line 105. Other input sources can comprise capture devices such as a video camera 109 or a server 110. The signals provided by the content sources can include a single content item or a multiplex that includes several content items.

The central location 101 can comprise one or a plurality of receivers 111a, 111b, 111c, 111d that are each associated with an input source. For example, MPEG encoders such as encoder 112, are included for encoding local content or a video camera 109 feed. A switch 113 can provide access to server 110, which can be a Pay-Per-View server, a data server, an internet router, a network system, a phone system, and the like. Some signals may require additional processing, such as signal multiplexing, prior to being modulated. Such multiplexing can be performed by multiplexer (mux) 114.

The central location 101 can comprise one or a plurality of modulators 115 for interfacing to the distribution system 116. The modulators can convert the received content into a modulated output signal suitable for transmission over the distribution system 116. The output signals from the modulators can be combined, using equipment such as a combiner 117, for input into the distribution system 116.

A control system 118 can permit a system operator to control and monitor the functions and performance of system 100. The control system 118 can interface, monitor, and/or control a variety of functions, including, but not limited to, the channel lineup for the television system, billing for each user, conditional access for content distributed to users, and the like. Control system 118 can provide input to the modulators for setting operating parameters, such as system specific MPEG table packet organization or conditional access information. The control system 118 can be located at central location 101 or at a remote location.

The distribution system 116 can distribute signals from the central location 101 to user locations, such as user location 119. The distribution system 116 can be an optical fiber network, a coaxial cable network, a hybrid fiber-coaxial network, a wireless network, a satellite system, a direct broadcast system, or any combination thereof. There can be a multitude of user locations connected to distribution system 116. At user location 119, a decoder 120, such as a gateway or home communications terminal (HCT) can decode, if needed, the signals for display on a display device, such as on a television set (TV) 121, a user device 123, or a computer monitor. As an example, the user device 123 can comprise a smartphone, a tablet, a PDA, a computer, and the like. Those skilled in the art will appreciate that the signal can be decoded in a variety of equipment, including an HCT, a computer, a TV, a monitor, or satellite dish. In an exemplary aspect, the methods and systems disclosed can be located within, or performed on, one or more HCT 120, TV 121, central locations 101, DVR, home theater PC's, and the like. In an aspect, user location 119 is not fixed. By way of example, a user can receive content from the distribution system 116 on a mobile device such as a laptop computer, PDA, smartphone, GPS, vehicle entertainment system, portable media player, and the like.

In an aspect, the distribution system 116 can distribute data (e.g., content programs) from the central location 101 to a content management system 122. A content program can be, for example, a television program, a movie, and the like. In an aspect, the content management system 122 can be configured to divide a content program into a plurality of content segments. For example, the content program can be divided into the plurality of content segments according to a predefined time interval (e.g., every 10 seconds), according to compression features of the content program (e.g., every I-FRAME), according to markers in the content program (e.g., every signaling of an encoder boundary point), other division strategies, or a combination thereof. The content management system 122 can associate (e.g., attach, insert) each of the plurality of content segments with a respective time index. In an aspect, a time index associated with a content segment can comprise a starting time that the respective content segment is to be provided. In another aspect, the content management system 122 can be configured to extract text data such as closed captioning data, subtitle, title, metadata (e.g., channel identifier, content broadcasting time, etc.), and the like, from a content program. In another aspect, the content management system 122 can be configured to divide the extracted text data into a plurality of text segments, and associate each of the plurality of text segments with the respective time index. In yet another aspect, the content management system 122 can extract a plurality of video frames (e.g., still images) from the content program at specific times. In an aspect, each of the plurality of video frames can be associated with a time index indicating the time at which a single video frame is to be provided. In an aspect, the content management system 122 can be configured to associate each of the plurality of text segments with one or more of the plurality of video frames based on associating the respective time index of each of the plurality of text segments and the specific times of each of the plurality of video frames. The plurality of content segments, the plurality of text data segments, and the plurality of video frames can be stored in the content management system 122 and can be associated based on their respective time indices.

In an aspect, the content management system 122 can be configured to provide one or more text segments and one or more of the plurality of video frames associated with the one or more text segments simultaneously to a device (e.g., TV 121, user device 123) at the user location 119. The electronic book or the electronic program guide can be rendered at a user device, for example TV 121, user device 123, or other devices at the user location 119. For example, an interface can be created on the TV 121 and/or user device 123. The interface can be, for example, in the form of an electronic book or an electronic program guide.

In an aspect, the content management system 122 can receive a query from a user device (e.g., user device 123) at the user location 119. For example, the query can comprise a text string, a time, a particular channel, a content type, or a combination thereof. As an example, a user can send a query to search for one or more content segments that contain a certain phrase in text data (e.g., closed captioning data). As another example, a user can send a query to search for one or more content segments provided on a certain channel. As another example, a user can send a query to search for one or more content segments that relate to a certain type of content (e.g., music, sports, movie, etc.). As another example, a user can send a query to search for one or more content segments scheduled to be provided at a certain time. The content management system 122 can be configured to identify one or more of the plurality of content segments based on the query from the user location 119.

Figure 2:
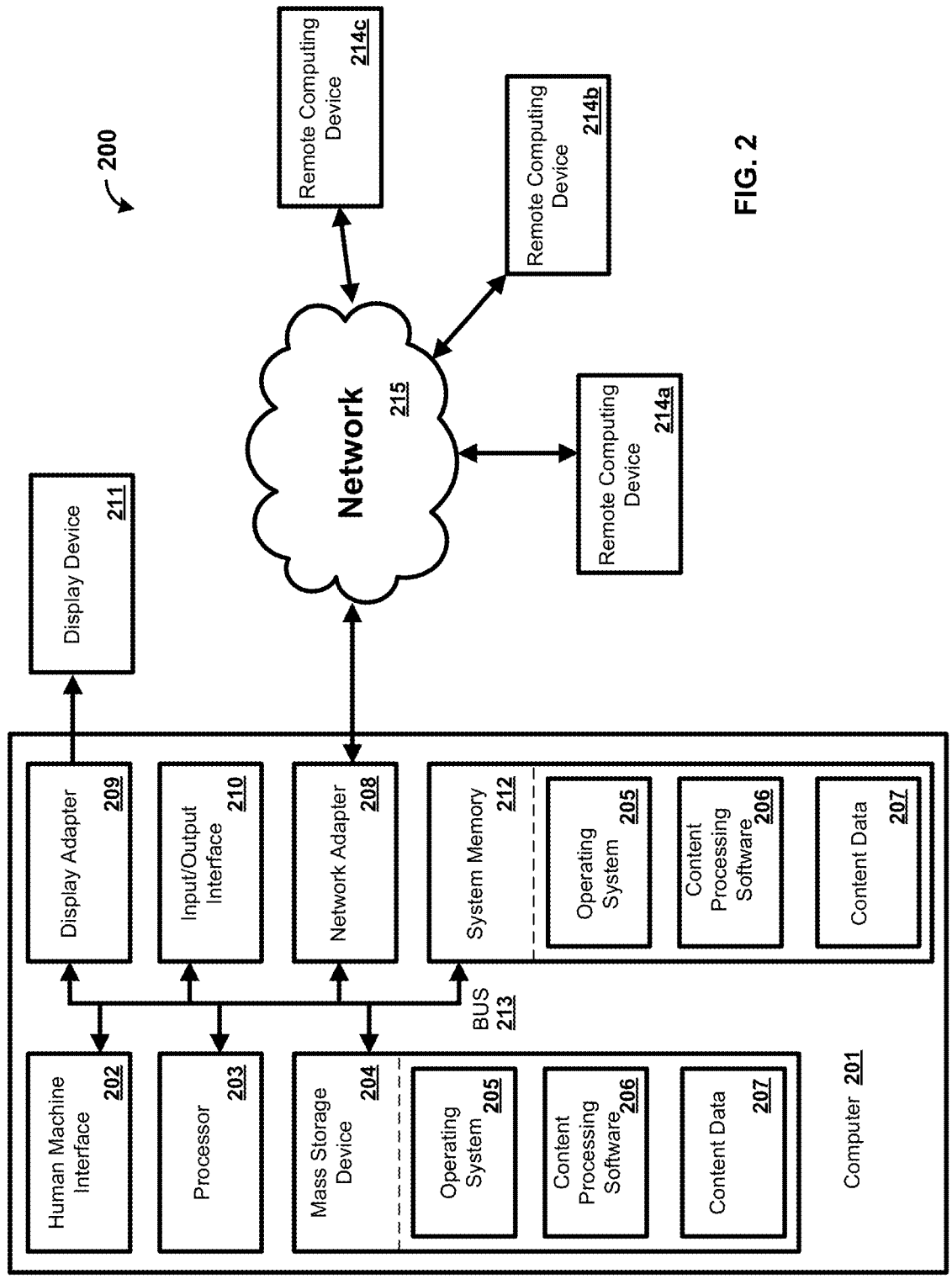
FIG. 2 is a block diagram of an exemplary computing device.

FIG. 2 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment. In an exemplary aspect, the methods and systems can be implemented on a computer 201 as illustrated in FIG. 2 and described below. By way of example, server 110 and/or the content management system 122 of FIG. 1 can be the computer 201 as illustrated in FIG. 2. Similarly, the methods and systems disclosed can utilize one or more computers to perform one or more functions in one or more locations.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 201. The components of the computer 201 can comprise, but are not limited to, one or more processors or processing units 203, a system memory 212, and a system bus 213 that couples various system components including the processor 203 to the system memory 212. In the case of multiple processing units 203, the system can utilize parallel computing.

The system bus 213 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 213, and all buses specified in this description can also be implemented over a wired or wireless network connection and each of the subsystems, including the processor 203, a mass storage device 204, an operating system 205, content processing software 206, content data 207, a network adapter 208, system memory 212, an Input/Output Interface 210, a display adapter 209, a display device 211, and a human machine interface 202, can be contained within one or more remote computing devices 214a,b,c at physically separate locations, connected through buses of this form, in effect implementing a fully distributed system.

The computer 201 typically comprises a variety of computer readable media. Exemplary readable media can be any available media that is accessible by the computer 201 and comprises, for example and not meant to be limiting, both volatile and non-volatile media, removable and non-removable media. The system memory 212 comprises computer readable media in the form of volatile memory, such as random access memory (RAM), and/or non-volatile memory, such as read only memory (ROM). The system memory 212 typically contains data such as content data 207 and/or program modules such as operating system 205 and content processing software 206 that are immediately accessible to and/or are presently operated on by the processing unit 203.

In another aspect, the computer 201 can also comprise other removable/non-removable, volatile/non-volatile computer storage media. By way of example, FIG. 2 illustrates a mass storage device 204 which can provide non-volatile storage of computer code, computer readable instructions, data structures, program modules, and other data for the computer 201. For example and not meant to be limiting, a mass storage device 204 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 204, including by way of example, an operating system 205 and content processing software 206. Each of the operating system 205 and content processing software 206 (or some combination thereof) can comprise elements of the programming and the content processing software 206. Content data 207 can also be stored on the mass storage device 204. Content data 207 can be stored in any of one or more databases known in the art. Examples of such databases comprise DB2®, Microsoft® Access, Microsoft® SQL Server, Oracle®, mySQL, PostgreSQL, and the like. The databases can be centralized or distributed across multiple systems.

In another aspect, the user can enter commands and information into the computer 201 via an input device (not shown). Examples of such input devices comprise, but are not limited to, a keyboard, pointing device (e.g., a "mouse"), a microphone, a joystick, a scanner, tactile input devices such as gloves, and other body coverings, and the like. These and other input devices can be connected to the processing unit 203 via a human machine interface 202 that is coupled to the system bus 213, but can be connected by other interface and bus structures, such as a parallel port, game port, an IEEE 1394 Port (also known as a Firewire port), a serial port, or a universal serial bus (USB).

In yet another aspect, a display device 211 can also be connected to the system bus 213 via an interface, such as a display adapter 209. It is contemplated that the computer 201 can have more than one display adapter 209 and the computer 201 can have more than one display device 211. For example, a display device can be a monitor, an LCD (Liquid Crystal Display), or a projector. In addition to the display device 211, other output peripheral devices can comprise components such as speakers (not shown) and a printer (not shown) which can be connected to the computer 201 via Input/Output Interface 210. Any step and/or result of the methods can be output in any form to an output device. Such output can be any form of visual representation, including, but not limited to, textual, graphical, animation, audio, tactile, and the like. The display 211 and computer 201 can be part of one device, or separate devices.

The computer 201 can operate in a networked environment using logical connections to one or more remote computing devices 214a,b,c. By way of example, a remote computing device can be a personal computer, portable computer, smartphone, a server, a router, a network computer, a peer device or other common network node, and so on. Logical connections between the computer 201 and a remote computing device 214a,b,c can be made via a network 215, such as a local area network (LAN) and/or a general wide area network (WAN). Such network connections can be through a network adapter 208. A network adapter 208 can be implemented in both wired and wireless environments. Such networking environments are conventional and commonplace in dwellings, offices, enterprise-wide computer networks, intranets, and the Internet.

For purposes of illustration, application programs and other executable program components such as the operating system 205 are illustrated herein as discrete blocks, although it is recognized that such programs and components reside at various times in different storage components of the computing device 201, and are executed by the data processor(s) of the computer. An implementation of content processing software 206 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Figure 3:
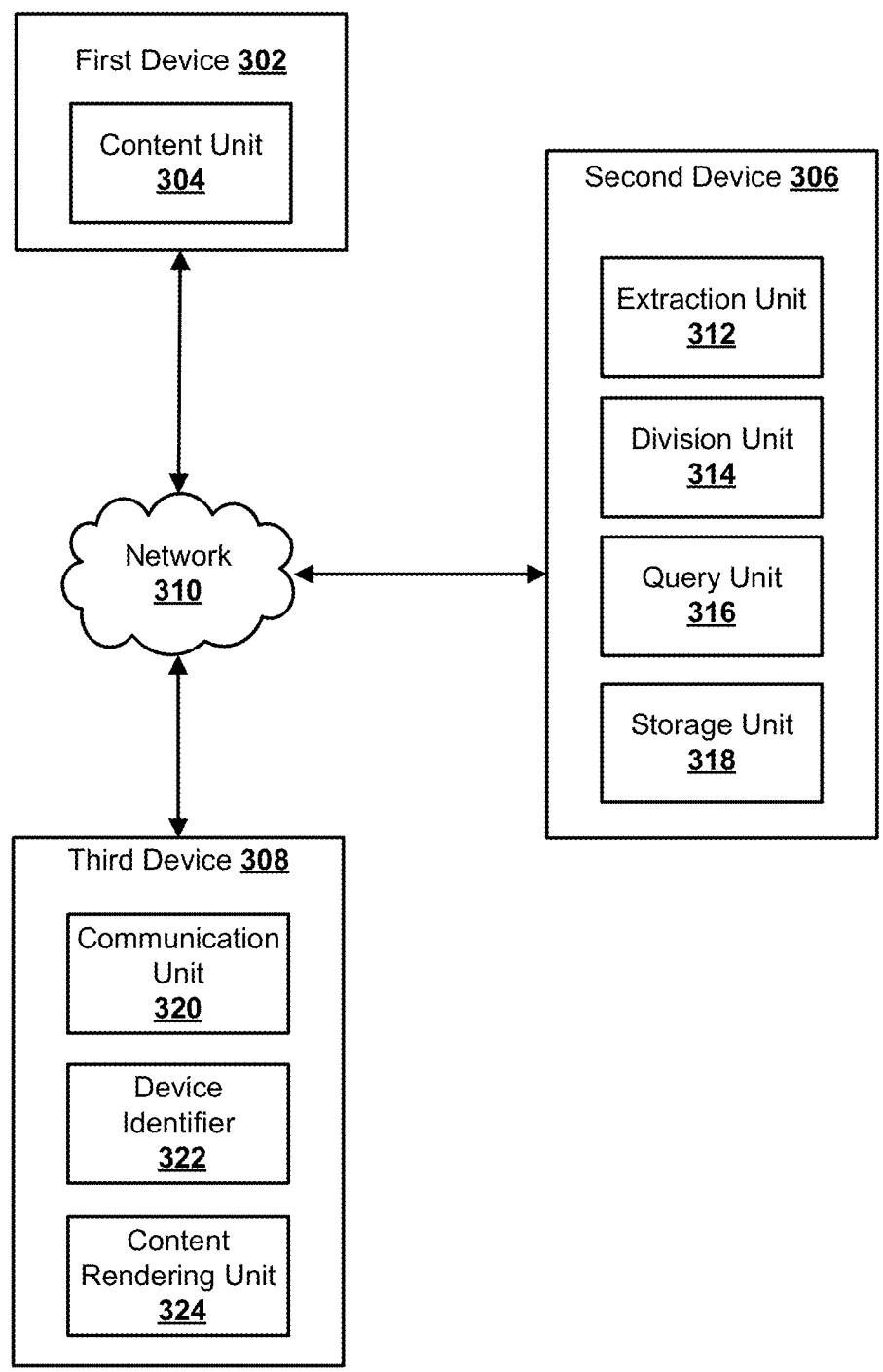
FIG. 3 is a diagram of an exemplary system and network.

FIG. 3 is a block diagram illustrating an example system 300 for implementing one or more aspects of the disclosure. In one aspect, the system 300 can comprise a first device 302. The first device 302 can be configured to provide (e.g., send, transmit, serve, deliver, render, output for display) content. The first device 302 can be, for example, a content provider or a gateway device connected to a content provider. Content can be, for example, video content and associated text content. The content can comprise one or more content programs, such as movies, television programs, and the like. The first device 302 can comprise a content unit 304. The content unit 304 can be configured to receive content from a variety of sources, such as from third-party content originators, to process content, and/or to provide content via a variety of transmission paths. For example, the content unit 304 can provide content via one or more content transmissions. The content transmissions can be delivered by broadcast, multicast, unicast, and/or the like. The content unit 304 can comprise one or more encoders, decoders, packagers (e.g., just in time packagers), modulators, demodulators, multiplexers (e.g., statistical multiplexers), and/or the like for processing the content.

In one aspect, the first device 302 can be communicatively coupled to one or more other devices, such as a second device 306 and/or a third device 308, through a network 310. The network 310 can comprise an access and/or delivery network for content, such as the Internet. The network can also comprise a local area network, wide area network, and/or the like. In one aspect, the network 310 can comprise one or more of a packet switched network (e.g., internet protocol based network), a non-packet switched network (e.g., quadrature amplitude modulation based network), and/or the like. The network 310 can comprise network adapters, switches, routers, modems, gateways and the like connected through wireless links (e.g., radio frequency, satellite) and/or physical links (e.g., fiber optic cable, coaxial cable, Ethernet cable, or a combination thereof). In one aspect, the network 310 can be configured to provide communication from telephone, cellular, modem, and/or other electronic devices to and throughout the system 300.

In one aspect, the second device 306 can be configured to provide (e.g., send, transmit, serve, deliver, render, output for display) one or more content related services. For example, the second device 306 can be configured as the content management system 122, as described in FIG. 1. The second device 306 can comprise a server, a gateway, customer premises equipment (CPE), a network interface device (NID), an optical networking unit (ONU), a headend, a terminal server, a cable modem terminal system, or other network device. In an aspect, the first device 302 and the second device 306 can be combined as a single device.

In an aspect, the second device 306 can comprise an extraction unit 312. The extraction unit 312 can be configured to extract text data and/or video frames from a content program. For example, the extraction unit 312 can be configured to extract closed captioning (CC) data in a movie, a television episode, a live program, and the like. In an aspect, the extraction unit 312 can be configured to extract a plurality of video frames (e.g., still images) in a content program according to a predefined time interval (e.g., one frame every 10 seconds), according to compression features of the content program (e.g., every I-FRAME), according to markers in the content program (e.g., every signaling of an encoder boundary point), other extraction strategies, or a combination thereof. In an aspect, the extraction unit 312 can perform the extraction process as a content program is being provided (e.g., sent, transmitted, served, delivered, rendered, outputted for display).

In an aspect, the second device 306 can comprise a division unit 314. For example, the division unit 314 can be configured to divide a content program (e.g., a movie, a television episode) into a plurality of content segments according to a predefined time interval. A predefined time interval can be, for example, every 10 seconds. As another example, the division unit 314 can be configured to divide the extracted data (e.g., text data) into a plurality of text segments. The division unit 314 can associate (e.g., insert, attach) a respective time index with each of the plurality of content segments and/or text data segments. In an aspect, the division unit 314 can perform the division process as a content program is being provided. For example, the division unit 314 can be configured to divide the extracted text data and/or video of the content program according to a predefined time interval (e.g., every 10 seconds), according to compression features of the content program (e.g., every I-FRAME), according to markers in the content program (e.g., every signaling of an encoder boundary point), other extraction methods, or a combination thereof.

In an aspect, the second device 306 can comprise a storage unit 318. For example, the storage unit 318 can store files generated by the extraction unit 312 and/or the division unit 314. In an aspect, the storage unit 318 can comprise one or more databases. For example, the one or more databases can be used to store a plurality of content segments, a plurality of text segments, a plurality of video frames, and/or respective time indices associated with each of the plurality of content segments, each of the plurality of text segments, and/or each of the plurality of video frames.

In an aspect, the second device 306 can comprise a query unit 316. In an aspect, the query unit 316 can receive a query from a user device (e.g., third device 308). In an aspect, a user of the third device 308 can send a query to the query unit 316 of the second device 306. The query can comprise a text string, a channel identifier, a content type, a time, or a combination thereof. As an example, the query can comprise a query to search for one or more content segments that contain a certain phrase in the text segments stored in the storage unit 318. As another example, the query can comprise a query to search for one or more content segments provided on a certain channel. As another example, the query can comprise a query to search for one or more content segments that are of a certain type of content (e.g., music, sports, movie, etc.). As another example, the query can comprise a query to search for one or more content segments scheduled to be provided at a certain time. As a specific example, the query can comprise "Red Sox," "Channel 9," and "after 7 PM." Accordingly, any content segments in the database associated with a text segment containing the text string "Red Sox" in the text data and provided on Channel 9 and after 7 PM can be identified. In an aspect, the query can be in the form of a voice command that is converted into a text query.

In an aspect, the query unit 316 can be configured to access the storage unit 318 to identify one or more content segments in response to the received query. For example, the query unit 316 can access the storage unit 318 at a predefined frequency (e.g., every 5 seconds) to search for content that matches the text string, the channel identifier, the content type and/or the time in the query. As such, any new program segments deposited at the storage unit 318 can be can be identified and/or notified to the user. In an aspect, any content segment associated with the text string the channel identifier, the content type, and/or the time in a query can be identified. For example, any content segment that contains "Red Sox," and provided on "Channel 9," and "after 7 PM," as specified in the query, can be identified. In an aspect, a content segment associated with the text string and/or the time in a query can be identified. In an aspect, the query unit 316 can request a specific content program associated with an identified content segment from a content provider (e.g., first device 302).

The system 300 can comprise a third device 308. As an example, the third device 308 can be a user device (computing device), such as a computer, a smartphone, a laptop, a tablet, a set top box, a display device, or other device capable of communicating with one or more of other devices (e.g., the first device 302, the second device 306) of the network.

In an aspect, the third device 308 can comprise a communication unit 320 for providing an interface for a user to interact with the third device 308 and/or providing communications between the third device 308 and the first device 302 and/or the second device 306. In an aspect, the communication element 320 can be any interface for presenting and/or receiving information to/from the user, such as a user query. An example interface can be a communication interface, such as a web browser (e.g., Internet Explorer, Mozilla Firefox, Google Chrome, Safari, or the like). Other software, hardware, and/or interfaces can be used to provide communication between the user and the third device 308. In another aspect, the communication unit 320 can request various files from a local source and/or a remote source.

As an example, the communication element 320 of the third device 308 can transmit data from the third device 308 to a local or remote device, such as the second device 306. For example, the communication element 320 can transmit a query to the second device 306 to identify certain content programs or segments of content programs that meet text and/or time criteria indicated in the query.

In an aspect, the third device 308 can be associated with a user identifier or device identifier 322. As an example, the device identifier 322 can be any identifier, token, character, string, or the like, for differentiating one user or user device (e.g., third device 308) from another user or user device. In a further aspect, the device identifier 322 can identify a user or user device as belonging to a particular class of users or user devices. As a further example, the device identifier 322 can comprise information relating to the user device, such as a manufacturer, a model or type of device, a service provider associated with the third device 308, a state of the third device 308, a locator, and/or a label or classifier. Other information can be represented by the device identifier 322. In an aspect, the device identifier 322 can be an internet protocol address, a MAC address, a network address, an Internet address, or the like. As an example, the device identifier 322 can be relied upon to establish a communication session between the third device 308 and the second device 306 or other devices (e.g., first device 302) and/or networks. The device identifier 322 can be used as an identifier or locator of the third device 308. The device identifier 320 can be persistent for a particular network and/or location. As an example, a query transmitted from the third device 308 to the second device 306 can comprise the device identifier 322. As another example, one or more identified content segments can be provided to the third device 308 according to the device identifier 322 of the third device 308.

In an aspect, the third device 308 can comprise a content rendering unit 324. The content rendering unit 324 can be configured to create an interface for presenting rendered content. For example, the interface can comprise an electronic book, an electronic program guide, or other format.

The interface can be used to present one or more text segments and one or more of the plurality of video frames associated with the one or more text segments simultaneously. For example, the content rendering unit 324 can be configured to receive data (e.g., video files, image files and text files) and present the received data via the created interface (e.g., an electronic book, an electronic program guide, etc.).

Figure 4:
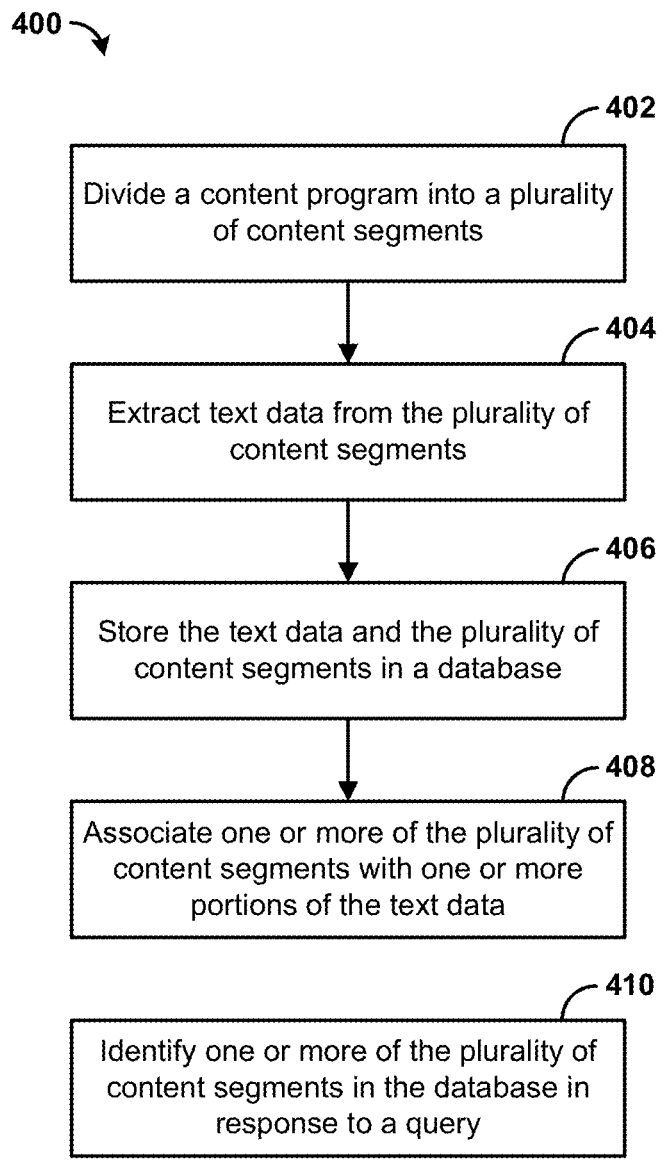
FIG. 4 is a flow chart of an exemplary method.

FIG. 4 is a flowchart illustrating an example method 400 for implementing one or more aspects of the disclosure. At step 402, a content program, or an item of content, can be parsed, segmented or divided into a plurality of content segments. In an aspect, each of the plurality of content segments can be associated with a respective time index. For example, the time index can comprise a relative time index (e.g., an offset from a beginning of a content item), a reference to a system clock or other absolute time, and the like. In an aspect, each of the respective time indices can comprise a start time the respective content segment is to be provided. For example, the division unit 314 can be configured to divide a content program (e.g., a movie) into a plurality of MPEG stream files. As an example, each of the plurality of MPEG stream files can be a predefined duration (e.g., 2 seconds). The division unit 314 can associate (e.g., insert, attach) the respective time index with each of the plurality of content segments.

At step 404, text data can be extracted from the plurality of content segments. In an aspect, the text data can comprise one or more of closed captioning data, subtitles, and/or metadata. As an example, the metadata can comprise one or more of, channel information, a content segment identifier, a content program title, a content program production date, a content program broadcast date, a content program broadcast time, content program review information, and/or the like. For example, the extraction unit 312 can extract text data from each of the plurality of content segments generated at the division unit 314. For example, text data can be extracted by identifying a starting point and an ending point of the text data within a streamed file, e.g., corresponding to starting and ending point of the corresponding content segment, and copying characters between the identified starting point and ending point. As another example, text data can be extracted by identifying a starting point of the text data within a steamed file, determining a corresponding number of characters associated with the text data, and copying the determined number of characters associated with the text data.

At step 406, the text data and the plurality of content segments can be optionally stored in a memory, such as a database. As an example, the text data and the plurality of content segments can be stored in the database of the storage unit 318 of the second device 306. In an aspect, respective time indices associated with the text data and each of the plurality of content segments can be stored along with the text data and the plurality of content segments. As an example, each time index can comprise a starting time of a respective content segment and/or text data.

At step 408, the text data can be associated (e.g., matched) with the plurality of content segments. In an aspect, the text data can be associated with the plurality of content segments based on the time indices of the plurality of content segments. In another aspect, the text data can be associated with a content segment from among the plurality of content segments as it is extracted in step 404. For example, as the text data is extracted from each of the plurality of content segments, it can be associated with the corresponding content segment (e.g., when the text data is extracted from a first content segment, the extracted text data can be associated with the first content segment).

At step 410, one or more of the plurality of content segments in the database can be identified in response to a query. The query can comprise a text string, a time, a date, a channel, or the like, or a combination thereof. As an example, a user can send a query to search for one or more content segments that contain a certain phrase in closed captioning data. As another example, a user can send a query to search for one or more content segments provided by a certain channel. As another example, a user can send a query to search for one or more content segments that are a certain type of content (e.g., music, sports, movie, etc.). As another example, a user can send a query to search for one or more content segments scheduled to be provided at a certain time. As a specific example, the query can comprise "Red Sox," "Channel 9," and "after 7 PM." Accordingly, any content segments in the database with "Red Sox" in the text data and provided on Channel 9 and after 7 PM can be identified. In an aspect, the query can be in the form of a voice command.

In an aspect, identifying one or more of the plurality of content segments in the database can comprise identifying the one or more of the plurality of content segments provided at a predefined time (e.g., after 7 PM) or provided at a predefined time period (e.g., 1 minute) before a present time. In an aspect, a predetermined time constant can be added or subtracted to the predefined time period for identifying the one or more of the plurality of content segments. For example, 5 seconds can be added to the predefined time (e.g., 1 minute) to ensure the user can have a brief lead-in to the content segments he would like to watch (e.g., the content segments that matched the user query). Similarly, 5 seconds can be subtracted from the predefined time (e.g., 2 PM) to provide a brief lead-in time to the content segments the user would like to watch (e.g., the content segments that matched the user query).

In an aspect, one or more query results can be provided to the user, e.g., after step 410. The one or more query results can comprise the one or more identified content segments that make up at least a portion of a content program. The one or more query results (e.g., the identified one or more of the plurality of content segments) can be provided to the user in the form of a notification. In an aspect, the notification can be provided via one or more of, a pop-up message, a text message, an E-mail message, and the like, on the third device 308. As an example, the notification can comprise one or more of, a title of the content program associated with the identified one or more of the plurality of content segments, channel information associated with the identified one or more of the plurality of content segments, a link to the identified one or more of the plurality of content segments, and review information associated with the identified one or more of the plurality of content segments. In an aspect, a maximum number of notifications can be set so that a number of notifications provided during a predefined length of time cannot be more than a predefined number. For example, a user can be sent up to a certain number of notifications (e.g., 5 notifications) for a query in a predefined duration of time (e.g., 1 hour).

In an aspect, the identified one or more of the plurality of content segments can be provided (e.g., sent, transmitted, served, delivered, rendered, outputted for display). As an example, the identified one or more of the plurality of content segments can be provided to one or more user devices (e.g., third device 308) associated with the user's account. For example, the identified one or more of the plurality of content segments can be provided via interacting with (e.g., clicking) a link to one or more of the plurality of content segments in the notification.

FIG. 5 is a flowchart illustrating another example method 500 for implementing one or more aspects of the disclosure. At step 502, text data can be extracted from a content program. In an aspect, the extraction unit 312 can extract text data from the content program (e.g., a movie, a television series). As an example, the text data can comprise closed captioning data. The text data can be divided into a plurality of text segments. The division unit 314 can divide the text data into a plurality of text segments, for example, according to a time interval (e.g., 2 minutes). In an aspect, each of the plurality of text segments can be associated with a respective time index based on the time interval. For example, the time index can comprise a starting time of a respective text segment. Specifically, if the starting time for providing a content program is 10 AM and the time interval is 2 minutes, the time indices associated the plurality of text segments can be 10:00 AM, 10:02 AM, 10:04 AM, 10:06 AM and so on.

At step 504, a plurality of video frames can be extracted from the content program at a specific time interval (e.g., the same or different from the time interval used to divide the plurality of text segments). For example, the specific time interval at which the extraction unit 312 can extract a video frame can be 1 minute. That is, one video frame can be extracted each time the specific time interval elapses, such that a plurality of video frames are extracted. In an aspect, each of the plurality of video frames can be associated with a respective time index based on the specific time interval. For example, if the starting time for providing a content program is 10:00 AM and the specific time interval is 1 minute, the time indices associated the plurality of video frames can be 10:00 AM, 10:01 AM, 10:02 AM, 10:03 AM and so on.

At step 506, each of the plurality of text segments can be associated (e.g., matched) with one or more of the plurality of video frames. For example, an association can be based on matching the respective time index associated with each of the plurality of text segments and the specific time interval. As described in step 502 and step 504, if the starting time for providing a content program is 10:00 AM, the time indices associated the plurality of text segments can be 10:00 AM, 10:02 AM, 10:04 AM, 10:06 AM and so on. The time indices associated the plurality of video frames can be 10:00 AM, 10:01 AM, 10:02 AM, 10:03 AM and so on. Therefore, each text segment can be matched with two corresponding video frames. For example, a first text segment (e.g., 10:00 AM text segment) can be associated with a first video frame (e.g., 10:00 AM video frame) and a second video frame (e.g., 10:01 AM video frame); the second text segment (e.g., 10:02 AM text segment) can be associated with a third video frame (e.g., 10:02 AM video frame) and a fourth video frame (e.g., 10:03 AM video frame). Accordingly, the text segments can be matched with the video frames even when the time intervals associated with the text segments and the specific time interval associated with the video frames are not equal.

At step 508, one or more text segments and one or more of the plurality of video frames associated with the one or more text segments can be accessed, packaged if needed, and provided (e.g., transmitted to a rendering device) at the same time, such as substantially simultaneously. As an example, the one or more text segments and one or more of the plurality of video frames associated with the one or more text segments can be provided (e.g., displayed) together in the form of an electronic book, as illustrated in FIG. 6A and FIG. 6B.

Figure 6A:
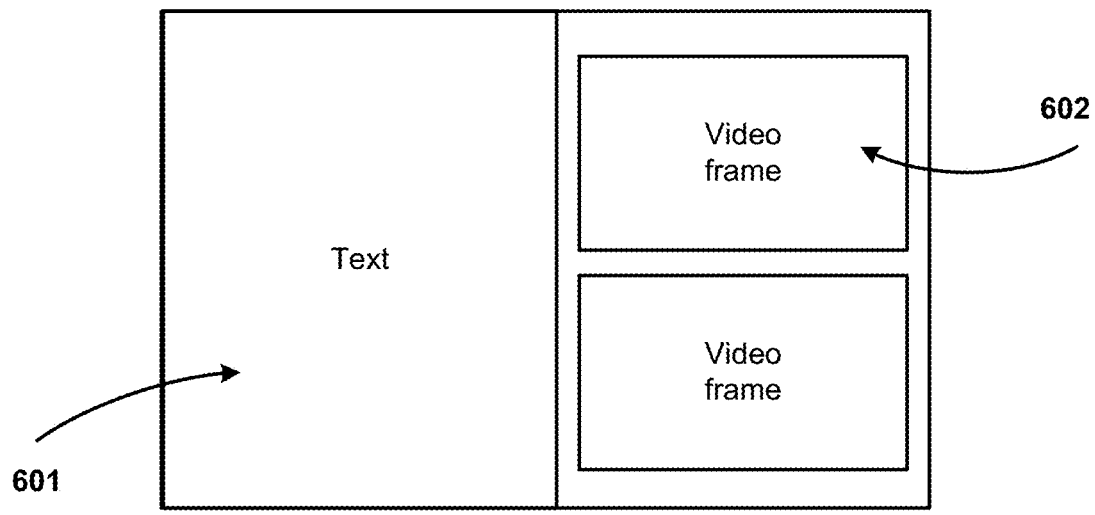
FIG. 6A illustrates an example of content presentation.
Figure 6B:
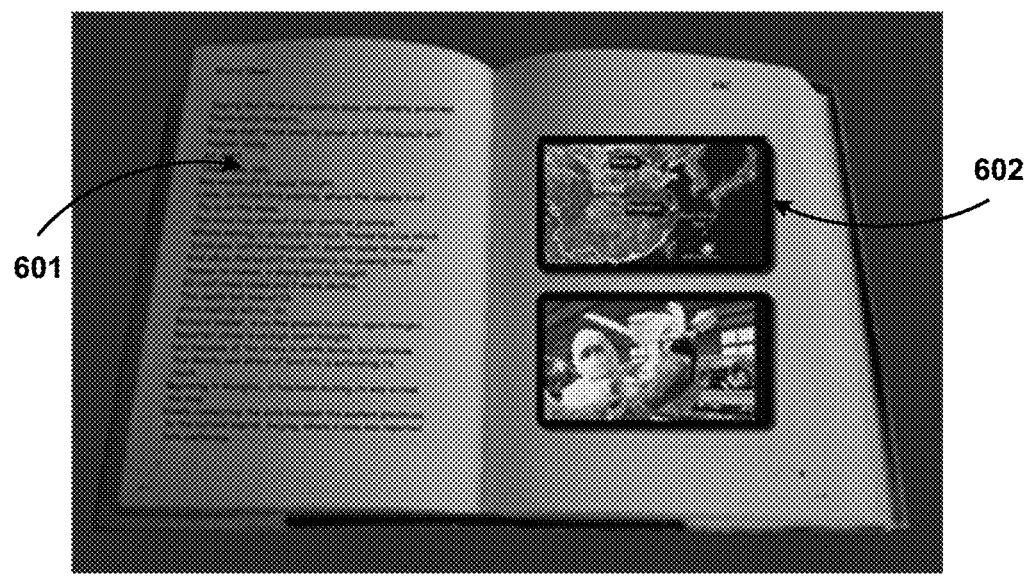
FIG. 6B is a diagram illustrating an example of content presentation according to FIG. 6A.

FIG. 6A shows a graphical representation of the electronic book formed from the plurality of video frames and the one or more text segments. FIG. 6B shows another (skeuomorphic) graphical representation of the electronic book formed from the plurality of video frames and the one or more text segments. In an aspect, the graphical representations shown in FIG. 6A and FIG. 6B can be displayed by a user device (e.g., the third device 308). As shown in FIG. 6A and FIG. 6B, one or more text segments 601 can be displayed as a horizontal writing. In an aspect, the one or more text segments 601 and one or more of the plurality of video frames 602 associated with the one or more text segments 601 can be provided according to a predefined speed. For example, an electronic book page can be updated at a predefined frequency (e.g., every 10 seconds). In another aspect, the one or more text segments 601 can be configured to scroll up and/or down. For example, the one or more text segments 601 can be configured to scroll up and/or down at a user controlled speed, such that a user can read the electronic book at a preferred speed.

Figure 7A:
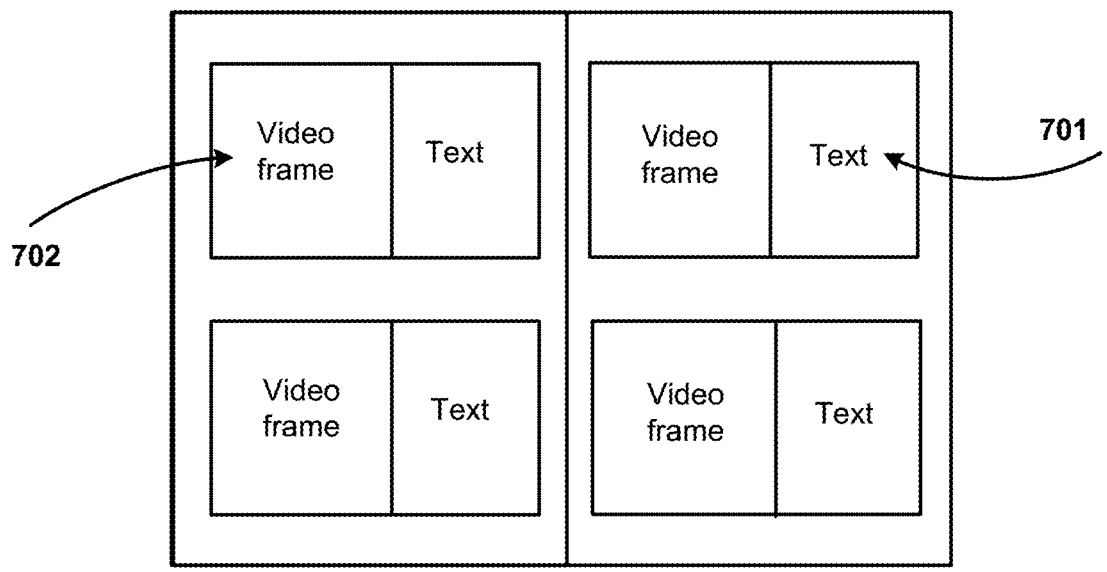
FIG. 7A illustrates another example of content presentation.
Figure 7B:
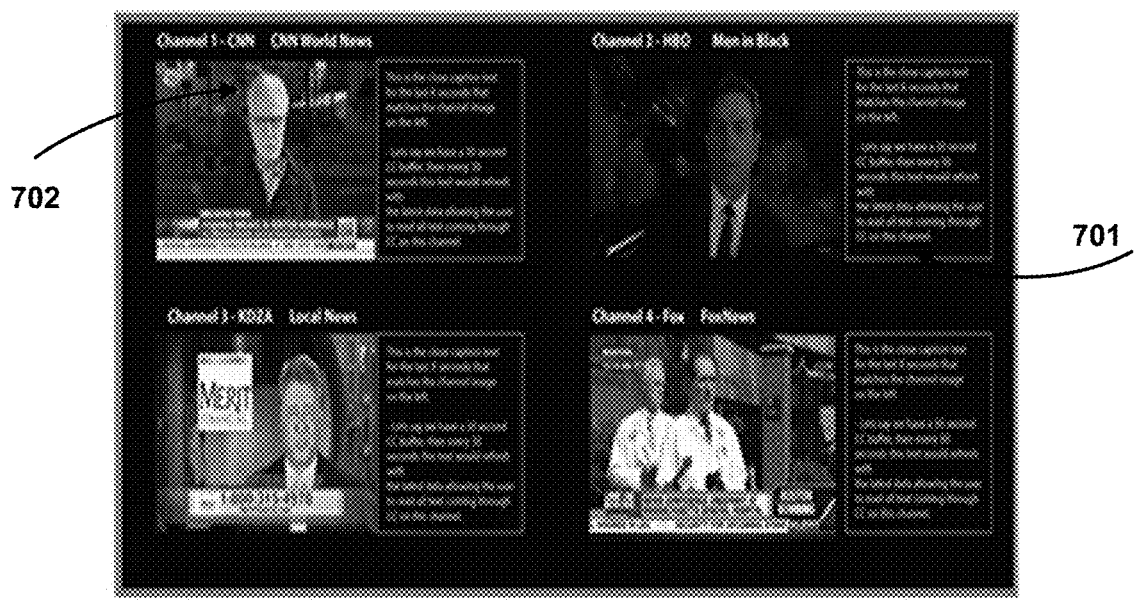
FIG. 7B is a diagram illustrating an example of content presentation according to FIG. 7A.

As shown in FIG. 7A and FIG. 7B, one or more text segments 701 and one or more of the plurality of video frames 702 associated with the one or more text segments 701 can be provided together in the form of a resource such as a menu, table, listing or a guide, e.g., an electronic program guide (EPG). In an aspect, a user can select a plurality of content programs to be displayed in the menu. In an aspect, the one or more text segments 701 and the one or more of the plurality of video frames 702 associated with the one or more text segments can be provided based on a time, a text query, or a combination thereof in a query. For example, a user can indicate channels with certain text phrases (e.g., Red Sox, football) to be shown in an electronic program guide. As another example, a user can indicate channels with certain type of content (e.g., sports, music) to be shown in an electronic program guide.

In an aspect, the menu can be created by extracting a plurality of video frames (e.g., every I-FRAME, every 10 seconds, etc.) and text data from the selected plurality of content channels and associating the plurality of video frames with respective text segments. In an aspect, the one or more text segments 701 can be displayed as a horizontal writing. The one or more text segments 701 and associated one or more video frames 702 can be provided (e.g., sent, transmitted, served, delivered, rendered, outputted for display) according to a predefined speed, such that a user can view the electronic program guide at a preferred speed. In an aspect, one or more text segments 701 and associated one or more video frames 702 can be presented in a plurality of forms. For example, one or more text segments 701 and associated one or more video frames 702 can be displayed in a left and right format, an up and down format, or any combination thereof. In an aspect, names of the content channels can be displayed, for example, on the top of the respective plurality of video frames 702.

In an aspect, text data of the plurality of text segments 701 can be further processed. For example, the text data can be converted to one or more of a plurality of languages (e.g., English, Spanish, French, etc.). A user can indicate a specific language in his query. As such, the specific language can be used in the EPG or the electronic book. In an aspect, the plurality of video frames can be further processed. As an example, the plurality of video frames can be processed to be in a plurality of sizes, a plurality of resolutions (e.g., 2K, 4K, etc.), and/or a plurality of content formats (e.g., MPEG, AVI, WMV, MOV, MKV, BMP, GIF, JPG, PNG, etc.).

In a further aspect, the electronic book and/or the EPG can be configured to provide (e.g., send, transmit, serve, deliver, render, output for display) a content program starting from a time point associated with a provided video frame via selecting the provided video frame. For example, by selecting a video frame, the content program can be played starting from the selected video frame. As another example, by selecting a video frame, the content program can be played from a predefined time (e.g., 5 seconds) ahead of the selected video frame. In an aspect, one or more text segments can be updated to synchronize with the content program being provided. As an example, the synchronization can be achieved by associating time indices of the plurality text segments and time indices of one or more of the plurality of video frames being provided in the electronic book and/or EPG with the time at which the user is viewing the electronic book and/or EPG.

FIG. 8 is a flowchart illustrating another example method 800 for implementing one or more aspects of the disclosure. At step 802, a plurality of content programs can be received. For example, a user can select a plurality of content programs to be displayed in an electronic program guide. In an aspect, the plurality of content programs can be received based on a time, a text query, or a combination thereof in a query. For example, a user can submit a query indicating certain text phrases (e.g., Red Sox, football) to be shown in an electronic program guide. As another example, a user can submit a query indicating a certain type of content (e.g., sports, music) to be shown in an electronic program guide.

At step 804, text data can be extracted from at least a subset of the plurality of content programs. In an aspect, the extraction unit 312 can extract text data from the content program (e.g., a movie, a television series). As an example, the text data can comprise closed captioning data. The text data for each of the subset of content programs can be divided into pluralities of text segments. Accordingly, each content program can have its text data extracted and from that text data a plurality of text segments can be created for that content program. An association can be maintained between content programs and the text segments from that content program. In an aspect, the division unit 314 can divide the text data into the pluralities of text segments, for example, according to a time interval (e.g., 2 minutes). The time interval can be different or the same for each content program. In an aspect, each of the plurality of text segments can be associated with a respective time index based on the time interval. For example, the time index can comprise a starting time of a respective text segment. Specifically, if the starting time for providing a content program is 10:00 AM, the time indices associated the plurality of text segments can be 10:00 AM, 10:02 AM, 10:04 AM, 10:06 AM and so on.

At step 806, a plurality of video frames can be extracted from the plurality of content programs at a specific time interval (e.g., the same or different from the time interval used to divide the plurality of text segments). For example, the extraction unit 312 can extract a plurality of video frames from the plurality of content programs at a specific time interval (e.g., 1 minute). In an aspect, each of the pluralities of video frames can be associated with a respective time index based on the specific time interval. An association can be maintained between content programs and video frames extracted from that content program. For example, if the starting time for providing a content program is 10:00 AM and the specific time interval is 1 minute, the time indices associated the plurality of video frames can be 10:00 AM, 10:01 AM, 10:02 AM, 10:03 AM and so on.

At step 808, each text segment of the pluralities of text segments can be associated (e.g., matched) with one or more of the pluralities of video frames. For each content program, the result can comprise one or more video frames from the content program associated with one or more of the plurality of text segments from the content program. For example, an association can be based on matching the respective time index associated with each text segment of the plurality of text segments and the specific time interval. As described in step 804 and step 806, if the starting time for providing a content program is 10:00 AM and the specific time interval is 2 minutes, the time indices associated the plurality of text segments can be 10:00 AM, 10:02 AM, 10:04 AM, 10:06 AM and so on. Similarly, if the specific time interval is 1 minute, the time indices associated the plurality of video frames can be 10:00 AM, 10:01 AM, 10:02 AM, 10:03 AM and so on. Therefore, each text segment can be matched with two corresponding video frames. For example, a first text segment (e.g., 10:00 AM text segment) can be associated with a first video frame (e.g., 10:00 AM video frame) and a second video frame (e.g., 10:01 AM video frame); the second text segment (e.g., 10:02 AM text segment) can be associated with a third video frame (e.g., 10:02 AM video frame) and a fourth video frame (e.g., 10:03 AM).

At step 810, an interface can be created. In an aspect, the interface can be used to present the plurality of content programs by displaying one or more of the pluralities of text segments and associated one or more of the pluralities of video frames substantially simultaneously. As an example, the one or more text segments and one or more associated video frames can be provided (e.g., sent, transmitted, served, delivered, rendered, outputted for display) together in the form of an EPG as illustrated in FIG. 7A and FIG. 7B. In an aspect, the interface can be configured to present the one or more text segments 701 and one or more associated video frames 702 according to a predefined speed, such that a user can view the electronic program guide at the predefined speed. In an aspect, the interface can be configured to present the one or more text segments 701 and one or more associated video frames 702 in a plurality of forms. For example, one or more text segments 701 and one or more associated video frames 702 can be displayed in a left and right format, an up and down format, or any combination thereof. In an aspect, names of selected channels (e.g., channels selected by a user) can be displayed, for example, on the top of the respective plurality of video frames 702.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

The invention claimed is:

1. A method comprising:
receiving, by a computing device, a query comprising a text string;
determining, at a first time point and based on an application of the query to first closed-captioning data associated with a first plurality of content segments, a first one or more content segments of the first plurality of content segments;
causing output of a first result comprising the first one or more content segments;
determining, at a second time point subsequent to the first time point and based on an application of the query to second closed-captioning data associated with a second plurality of content segments, a second one or more content segments of the second plurality of content segments, wherein the second plurality of content segments comprises at least a portion of the first plurality of content segments; and
causing output of an update to the first result, wherein the update to the first result comprises the second one or more content segments.

2. The method of claim 1, wherein the first time point and the second time point are based on a predetermined frequency.

3. The method of claim 1, further comprising causing, based on the query, output of a notification associated with the first one or more content segments, wherein the notification comprises a title of a content program associated with at least a portion of the first one or more content segments.

4. The method of claim 1, further comprising:
receiving a request for a content program associated with the first one or more content segments, wherein receiving the request for the content program comprises:
receiving, from a user device, a parameter indicative of a speed, and wherein the method further comprises causing output of the first closed-captioning data at the speed.

5. The method of claim 1, further comprising:
determining closed-captioning data of the first one or more content segments; and
causing output of the closed-captioning data of the first one or more content segments.

6. The method of claim 5, further comprising:
determining a quantity of buffer time associated with the first one or more content segments; and
causing, based on the quantity of buffer time, output of the first one or more content segments.

7. A method comprising:
sending a query comprising a text string;
receiving, based on an application, at a first time point, of the query to first closed-captioning data associated with a first plurality of content segments, a first indication indicative of a first one or more content segments of the first plurality of content segments;
receiving, based on an application, at a second time point subsequent to the first time point, of the query to second closed-captioning data associated with a second plurality of content segments, an update for the first indication to a second indication, wherein the second indication is indicative of a second one or more content segments of the second plurality of content segments and wherein the second plurality of content segments comprise at least a portion of the first plurality of content segments; and
based on an interaction with the second indication, causing output of the second one or more content segments of the second plurality of content segments.

8. The method of claim 7, further comprising:
sending, based on an interaction with the first indication, a request associated with the first one or more content segments of the first plurality of content segments; and
receiving, based on the request, the first one or more content segments of the first plurality of content segments.

9. The method of claim 7, wherein causing output of the first one or more content segments comprises causing output of a portion of the first closed-captioning data associated with the first one or more content segments.

10. The method of claim 7, wherein the first indication comprises a notification comprising a pop up message.

11. The method of claim 7, wherein the first indication comprises a notification comprising a title of a content program associated with at least a portion of the first one or more content segments.

12. The method of claim 7, further comprising:
sending a parameter indicative of a speed, wherein causing output of the first one or more content segments comprises:
causing output of the first closed-captioning data associated with the first one or more content segments and a plurality of video frames associated with the first one or more content segments at the speed.

13. The method of claim 7, wherein the first time point and the second time point are based on a predetermined frequency.

14. The method of claim 7, wherein the second plurality of content segments comprises each content segment of the first plurality of content segments.

15. A method comprising:
extracting text data from a content program wherein the text data are divided into a plurality of text segments, wherein one or more text segments of the plurality of text segments is associated with a respective time index;
extracting a plurality of video frames from the content program at a specific time interval;
associating each of the plurality of text segments with one or more of the plurality of video frames based on associating the respective time index of each of the plurality of text segments and the specific time interval; and
providing one or more of the plurality of text segments concurrent with one or more of the plurality of video frames associated with the one or more of the plurality of text segments, wherein the one or more of the plurality of text segments and the one or more of the plurality of video frames are selected based on a query comprising a text string and a time range within a duration of the content program.

16. The method of claim 15, wherein the text data comprises closed-captioning data.

17. The method of claim 15, wherein the one or more text segments of the plurality of text segments and the one or more of the plurality of video frames associated with the one or more text segments are provided as an electronic program guide.

18. The method of claim 15, wherein the one or more text segments of the plurality of text segments and the one or more of the plurality of video frames associated with the one or more text segments of the plurality of text segments are provided as an electronic book.

19. The method of claim 15, wherein the one or more text segments of the plurality of text segments and the one or more of the plurality of video frames associated with the one or more text segments of the plurality of text segments are provided based on the time index.

20. The method of claim 15, wherein the one or more text segments of the plurality of text segments and the one or more of the plurality of video frames associated with the one or more text segments of the plurality of text segments are provided according to a predefined speed.

\* \* \* \* \*